PROCESS AND APPARATUS FOR PYROLYTIC PRODUCTION OF PURE SEMICONDUCTOR MATERIAL, PREFERABLY SILICON
Filed Jan. 25, 1962
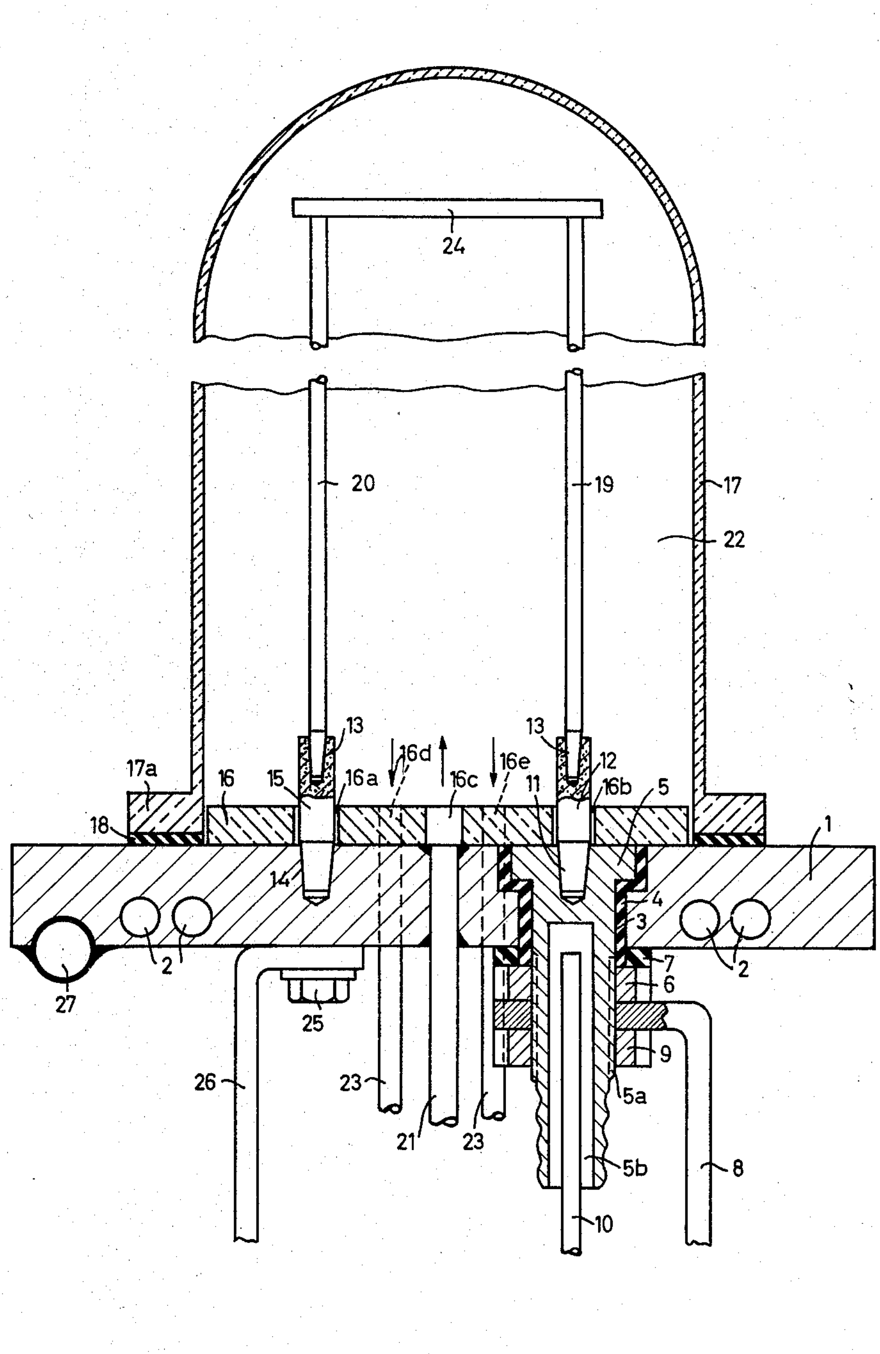

United States Patent Office 3,286,685

Patented Nov. 22, 1966

3,286,685

PROCESS AND APPARATUS FOR PYROLYTIC PRODUCTION OF PURE SEMICONDUCTOR MATERIAL, PREFERABLY SILICON

Herbert Sandmann, Nurnberg, and Ulrich Rucha, Munich, Germany, assignors to Siemens-Schuckertwerke Aktiengesellschaft, Berlin-Siemensstadt, Germany, a German corporation Filed Jan. 25, 1962, Ser. No. 168,756
Claims priority, application Germany, Jan. 26, 1961, S 72.220
11 Claims. (Cl. 118—49.1)

Our invention relates to apparatus for the pyrolytic production of pure semiconductor material, such as germanium and particularly silicon, by mounting one or more carrier structures, preferably core bodies of the same semiconductor material as the one to be produced, in a processing vessel and heating the carrier structure or cores electrically by passing current therethrough while simultaneously subjecting the heated structure to a flow of a gaseous or vaporous atmosphere containing a compound of the semiconductor material, which compound then becomes pyrolytically decomposed with the result that the semiconductor component is precipitated onto the carrier structure.

A known pyrolytic processing apparatus of this type comprises a bell-shaped recipient whose sealing edge is tightly seated on a base plate. The base plate carries holders for the structures or core bodies upon which the semiconductor material is to be precipitated. The holders serve also as terminals to be connected with an electric voltage source outside of the processing space in order to thereby heat the precipitation carriers, then serving as current-traversed electric resistance conductors, to the desired pyrolytic temperature. For the production of silicon, the carrier temperature thus produced is above 900° C., preferably between 1100° C. and 1400° C. The base plate is further provided with one or more inlet openings or pipes which communicate with the processing chamber through nozzles for supplying it with one or more flows of the gaseous atmosphere containing the semiconductor element as a component. As a rule, the gaseous compound of the semiconductor element is diluted with a carrier or reagent gas, preferably hydrogen. The base plate also has an outlet opening for discharging the residual gases which have become depleted of the semiconductor element by the thermal dissociation.

Relating to pyrolytic production apparatus of the above-mentioned kind, it is an object of our invention to improve such apparatus toward augmented efficiency and continued preservation of the extremely high purity desired in the semiconductor product even after prolonged periods of operation, as well as to prolong the useful period of time during which such processing apparatus can be employed without requiring shutdown for major cleaning or overhauling purposes.

More specifically it is an object of our invention to make certain that the efficiency of the pyrolytic processing plant, i.e. the proportion of the hyperpure semiconductor material precipitated upon the carrier structure compared with the entire amount of substance supplied to the processing space of the apparatus, is as large as possible, and further that the precipitated semiconductor material on the carrier structure is actually in purest feasible condition and remains in such condition during extended periods of pyrolytic production.

For such purposes, it has become known to use as precipitation carriers for the semiconductor material to be produced by thermal dissociation, core rods of the same semiconductor material having generally the same high degree of purity. However, the attainable efficiency in the production of hyperpure semiconductor material precipitated in such a plant is also essentially dependent upon having the by far dominant portion of the material precipitating from the gaseous phase deposited onto the precipitation carrier structures or core rods rather than upon the walls of the vessel in which the thermal dissociation process is being carried out. It is therefore important and constitutes a more specific object of our invention that all inner wall surfaces of the entire pyrolytic processing space are made to thermally behave in substantially the same manner by having substantially the same temperature obtain at all localities of the inner surface and maintaining this temperature at a desired ratio, or within a desired range, with respect to the pyrolytic processing temperature maintained at the precipitation carriers.

Another requirement for securing the production of semiconductor material in purest feasible condition is that any amount of foreign substances contained within the processing space be kept at the utmost minimum, inasmuch as such foreign substances, during precipitation of the semiconductor material to be produced, can become embedded therein. This requirement is tantamount to the prerequisite that the inner surfaces of the processing vessel be so designed that they can be cleaned in a simple manner, and it is therefore a more specific object of our invention to also improve the pyrolytic processing equipment in this respect.

Another, more specific, object of our invention is to afford ready changing and adapting the distance from the inner peripheral surfaces in the processing chamber to the precipitation carrier structure or core rods, depending upon the particular type of material or particular operation chosen for the equipment. This object is tantamount to the aim of minimizing any quantity of semiconductor material that becomes precipitated, not on the carrier structure, but on the inner surfaces of the precipitation vessel and thus becomes lost with respect to the useful yield of the process. From this viewpoint, the distance from the inner vessel walls to the heated precipitation carriers is critical because a greater distance reduces the amount of such useless precipitation. The just-mentioned object of the invention, therefore, is to permit using wider or narrower recipients depending upon the requirements or desiderata of the intended production.

To achieve the above-mentioned objects, and in accordance with a feature of our invention, the base plate of the processing vessel, on which the electrically conducting terminals or holders for the precipitation carriers or core rods are mounted and which are traversed by inlet and outlet passages for the gases and, as the case may be, by electric leads for passing current through the precipitation carriers, consist of a metal plate whose top surface, facing the inner space of the processing vessel, is ground or lapped to completely planar shape. Due to its planar shape, the horizontal top surface of the base can be cleaned in a particularly simple manner. Consequently, the surface facing the inner space of the precipitation apparatus, can easily be freed, prior to each production run, from all substances that may impair the properties of the semiconductor material to be pyrolytically precipitated onto the carrier structures. The planar top surface of the base plate also permits recipient bells or cylinders of different inner widths or different base areas to be placed onto the base. Each of said bells can readily be sealed and tightened directly on this top surface by means of a gasket, e.g. polytetrafluorethylene which is available under the trademark Teflon. In this manner, the inner width of the recipient and thus the distance of its peripheral wall from the heated precipitation carriers can be chosen in accordance with the particular requirements. Such an adaptation is a very simple matter becase the active components of the apparatus are all associated with the base, whereas the exchangeable recipient bell constitutes only an enclosure but does not carry any structure otherwise required in the performance of the production process.

According to another feature of our invention, an auxiliary plate is placed on top of the above-mentioned base and in face-to-face contact therewith. The auxiliary or insert plate consists of a material which, like that of the recipient bell, differs from the metal of the base and is similar to the bell material in thermal respect so that the insert plate constitutes a heat-protective shield with respect to the base. Since, as a rule, the recipient bell 17 consists of vitreous material, preferably quartz, the insert plate is preferably made of the same material such as quartz. The intermediate plate, for example of quartz, is so designed that it can be placed over those parts that protrude from the top surface of the base plate into the interior of the recipient bell, whereby the bottom surface of the insert plate comes into contact with the top surface of the metallic base and thus constitutes a heat shield for protecting the metal base from the effects of the highly heated gaseous atmosphere and of the radiation issuing from the glowing precipitation carriers.

According to another feature, the vitreous insert plate, preferably of quartz, is so dimensioned, relative to the structural parts protruding upwardly from the metallic base, and relative to the dimensions of the inner peripheral surface of the bell-shaped recipient being used in a particular case, that only very narrow gaps remain between the insert plate and the other parts, to minimize any possible direct thermal action, through said gaps, upon the surface of the metal base.

The quartz plate thus placed upon the metallic base plate has the effect of constituting a device with a predetermined thermal resistance for the heat flux (temperature gradient) from the high temperature obtaining in the processing space within the recipient and through the insert plate to its outer surface. Due to this thermal resistance, the temperature gradient in the insert plate is such that only a relatively low temperature is present at the surface of mutual contact between the quartz plate and the metallic base plate. This contacting temperature is preferably kept so low as to permit the use of a high-quality insulating material, even if its limit of temperature resistance is relatively low, at the localities where the electric leads pass through the base plate to the precipitation carrier rods. The insulating material just mentioned is also required to be chemically resistant or inert with respect to the substances that are supplied to the processing space of the apparatus or which evolve during the thermal dissociation and the chemical reactions resulting therefrom. Such an insulating material as mentioned above is available under the trademark Teflon and consists of polytetrafluorethylene.

The auxiliary intermediate plate is preferably so arranged in the processing space on top of the metallic base plate that it is loosely held in position by gravity only. This affords the desired ease in exchanging the plate. Such exchange is of advantage, if apparatus according to the invention is to be used for operation at different pyrolytic temperatures, for example in order to accelerate the precipitation process by the choice of a higher precipitation temperature or for the purpose of improving the crystalline structure of the precipitant such as down to monocrystalline condition in the event a carrier structure of monocrystalline material is employed. If in this manner a higher temperature is to be employed in the processing space of apparatus according to the invention, then an equally favorable effect in thermal respects relative to the above-described protection of the metallic base plate is obtained by making certain that the auxiliary insert plate, consisting for example of quartz, will constitute a thermal resistance of greater resistance value. In other words, when increasing the processing temperature the plate is preferably given a greater thickness so that a correspondingly greater temperature drop occurs between the terminal points of the temperature flow path. The described exchangeability of the loosely inserted auxiliary plate, therefore, is also of advantage in certain cases where the diameter of the recipient bell remains unchanged.

It will be understood that the insert plate need not be made exchangeable, if for an apparatus with a given number of recipient bells having respectively different inner diameters, a corresponding number of auxiliary insert plates having respectively different diameters are all joined together with the metallic base so that each upper insert plate is smaller than the lower one, and each insert plate has a marginal ring area to serve as a seating and sealing surface for one of the respective bells. Such a design would also afford a good mutual adaptation between the respectively different recipient bells and the single base plate of the apparatus. However, the design requires a considerably greater number of sealing surfaces than needed when the recipient bell is directly placed and sealed upon the top surface of the metal base, using only an intermediate gasket strip as described above and making the insert plate exchangeable as illustrated and described. The single annular sealing surface on the metallic base is readily obtainable by grinding the top surface of the base, for example by a lapping operation.

The ready exchangeability of the auxiliary insert plate is also essential in cases where it is desirable to give the recipient bell a particularly large dimension so that the recipient bell encloses a correspondingly larger volume for the purpose of a different mode of operation which makes it desirable to further minimize the possibility of obtaining a precipitant of semiconductor material on the inner peripheral surface of the bell. Such an adaptation is favorable in cases where, by maintaining a constant molar ratio between the compound (for example $SiCl_4$ or $SiHCl_3$) containing the semiconductor substance Si to be precipitated and the diluting carrier gas (for example $H_2$), the supply of the gas mixture into the processing space is increased to a larger quantity per unit of time, relative to substantially the same pressure as previously present, so as to produce a greater amount of precipitation per unit of time on the carrier bodies. Investigation has shown that for obtaining a greater precipitation quantity on the carrier bodies, not only an increase of the gas quantity supplied per unit of time, relative to the nearly constant pressure, is a determining factor, but that also the period of time during which this gaseous quantity is subjected to dissociation and can dwell in the processing space. This dwell time for the gas increases with the volume enclosed by the recipient of the apparatus.

It is therefore also within the scope of our invention to provide the above-described apparatus with a base plate of such dimensions that, depending upon the requirement or desiderata, recipients can be placed and gas-tightly sealed on the base, as are preferable for a given adaptation of the recipient volume to the quantity of gas to be supplied in the particular case.

For the purposes of the invention, it has further been found preferable to select the inserted auxiliary plate of such thickness that the top surface of the metallic base is subjected to a certain minimum temperature which is sufficiently high to prevent the precipitation of polysilanes of oily character, from the reaction product. Thus, it has been found useful to maintain the temperature on the top surface of the metallic base plate at a minimum temperature of approximately 70 to 100° C.

The metallic base plate is preferably made of silver. This material can be machined in a relatively easy manner and is a good heat conductor so that the heat transferred to the base during operation of the apparatus is readily dissipated to its external surfaces or to any surfaces subjected to the flow of a coolant. For such cooling purposes, a cooling channel may be provided in or on the metallic base plate, which channel can be traversed by a flow or circulation of liquid or gaseous coolant. It is preferable to also cool in this manner the electric leads of the base plate through which electric current is supplied to the precipitation bodies in order to heat the latter. These inleads are preferably so dseigned that their bodies engage each other by conical or cylindrical seating surfaces. One of these bodies may be made of the above-mentioned Teflon material if the lead is to be insulated from the metallic material of the base plate.

The holder bodies for the precipitation carriers are preferably made of graphite, it being preferable according to the invention to employ a mechanical interconnection between the graphite holders and the precipitation carriers that can be made without the use of tools. If it were necessary to employ tools for this purpose, they would have to be cleaned thoroughly. Furthermore, even perfectly clean tools would cause frictional wear when being used on the connections to be tightened or loosened, whereby undesired foreign substances would enter into the processing space. Such undesired impurities tend to vaporize during operation of the apparatus and to then precipitate and deposit upon the precipitation carriers together with the semiconductor material being produced, thus impairing the electric qualities of the product. The mechanical connection just mentioned can be effected in a simple manner by having the precipitation carrier enter into a conical-fit engagement with an interior or exterior peripheral surface of the graphite holder bodies. For interconnecting the holders and the precipitation carriers, the latter need then only be stuck into the holders and then directly attain their final seat in the holders. For removing the precipitation carriers from the holders it is only necessary to pull them out of the seat. This can be done without disadvantage to the semiconductor material by using a clean intermediate web material for gripping the semiconductor material, for example a coil of copper acetate rayon.

While the invention has been described with particular reference to the production of pure silicon from gaseous compounds, for example monosilane, monochlorsilane, dichlorsilane, trichlorsilane and silicon tetrachloride, in mixture with hydrogen to serve as a carrier gas, dilutant or reagent, however, the invention is applicable in the same manner for the production of all other semiconductor materials involving fundamentally similar or the same conditions as described with reference to silicon and requiring the semiconductor material to be pyrolytically precipitated from a gaseous compound thereof.

The above-mentioned and other objects, advantages and features of our invention, said features being set forth with particularity in the claims annexed hereto, will be apparent from, and will be described in, the following with reference to the embodiment of pyrolytic semiconductor-producing apparatus illustrated by way of example on the accompanying drawing which shows a vertical section through the entire processing vessel and the appertaining components.

The apparatus comprises a base plate 1, consisting of thermally good conducting metal, preferably silver. The plate 1 is provided with channels 2 which form a coil or winding for a flow of coolant, for example softened water. The metal base 1 is traversed by a bore 3. The bore is occupied by an electric inlead conductor 5, which is insulated from the base 1 by an insulating sleeve 4. The conductor 5 is inserted from above into the bore 3 and has a flange-like top portion resting against a shoulder of the bore. The lower end of conductor 5 is provided with a screw-thread **5*a* in engagement with a fastening nut 6 which by means of an insulating intermediate washer mechanically tightens the conductor 5 to its seat in the bore 3. An angular bus bar 8 is placed upon the threaded portion 5*a* of conductor 5 and tightened by means of a second nut 9. The lower end of conductor 5 is further provided with a hollow space 5*b* for cooling purposes. A pipe 10, for supply of a coolant, extends into the hollow space. During operation, a flow of coolant, for example air, is passed through the pipe 10 and, after issuing from the upper end of pipe 10, flows along the inner peripheral surface of the hollow space 5*b*, thus cooling the conductor 5**.

The upper surface of conductor 5 is planar and is provided with a central conical recess 11 which forms a seat into which a holder body 12 of graphite or other carbon material is inserted. The lower end of the carbon holder 12 is conical and mates with the conical recess 11 in order to provide for a tight fit. The upper end of the carbon holder 12 is provided with another conical recess 13 for attachment of a semiconductor core rod, as will be described hereinafter.

The metallic base plate 1 is provided with a conical recess 14, into which a second graphite or carbon hoder 15, identical with the holder 12, is tightly inserted.

An insert plate 16 is placed upon the top surface of the silver plate 1, to serve as a heat-protection shield. The plate 16 is provided with openings **16*a* and 16*b*, permitting the plate to be placed over the two holders 12 and 15 so that it lies snugly on the top planar surface of the base 1. The plate 16 consists of vitreous material similar or identical with the material of the recipient bell described hereinafter. Quartz is preferably the material for the plate 16 and for the bell. For forming an enclosed processing space, the bell-shaped recipient 17, consisting preferably of quartz, has its lower edge provided with a flange 17*a* by means of which the bell 17 is seated and clamped onto the planar top surface of base 1, with a gasket ring 18 inserted between the flange and the base. The gasket ring 18 consists, for example, of polytetrafluorethylene, such as available under the trade name Teflon. The above-mentioned insulating sleeve 4 and the insulating washer 7 may consist of the same polytetrafluorethylene. The device for clamping the flange 17*a* against the base 1** is not illustrated as it may be of any suitable conventional device such as several C-clamps.

The correspondingly conical ends of respective precipitation carriers 19 and 20 are inserted into the conical recesses at the upper ends of the carbon holders 12 and 15. These two precipitation bodies, in the illustrated embodiment, consist of originally thin core rods of semiconductor material of the same order of purity as that to be produced by pyrolytic precipitation. That is for the production of silicon from a mixture of silicon compound and hydrogen, core rods of hyperpure silicon are employed. The gas to be pyrolytically processed is supplied by means of an inlet pipe 21 and the bore **16*c* of the quartz plate 16 through which it passes into the processing space 22 within the recipient bell. The spent gases, depleted of semiconductor material, leave the processing space through bores 16*d* and 16*e* of plate 16 and through outlet pipes 23**.

For the production of silicon, the two rods 19 and 20 consist of silicon and the gas supplied through pipe 22 may then consist of a mixture of silico-chloroform and hydrogen.

For the purpose of thermal dissociation, the two precipitation carriers 19 and 20 serve as electric resistance conductors. For this purpose, they are connected with each other by a conducting bridge 24 at their respective upper ends. The connecting bridge 24 may also consist of graphite or other carbon material or also of pure silicon. The lower end of rod 20 is conductively connected through holder 15 by means of the metal plate 1 and a screw bolt 25 to angular bus bar 26. The lower end of rod 19 is conductively connected through holder 12 at conductor 5 with the bus bar 8. The two bus bars 8 and 26 are connected to a suitable voltage source (not shown).

During operation, sufficient current is supplied through the rods 19 and 20 to maintain them at the necessary incandescent temperature required for the pyrolytic precipitation process, this temperature being, for example, about 1200° C.

The temperature of the metal plate 1 is sensed by a temperature sensor 27 which is shown only schematically. The temperature gage also initiates a control for the supply of coolant through the channels 2 so that the base plate 1 does not exceed the given upper temperature limit which may be detrimental to the electric insulation components 4, 7 and the gasket ring 18. Since, as a rule, the temperature drop between the top surface of base 1 adjacent to the processing chamber 22 on the one hand and the location of the temperature sensor 27 on the other hand is slight, the temperature sensor can also be used to control the temperature of the just-mentioned surface area of base 1 adjacent to the processing space 22 so that its value does not drop below that value at which undesired oily polysilanes precipitate from the reaction product evolving in the processing space 22. Such polysilanes may be dangerous to the operating personnel. Their elimination is necessary in order to prevent the occurrence of explosion-type phenomena. Moreover, the formation of polysilanes requires the use of cleaning tools. Such use, in turn, may result in undesired contamination at the surface of the base plate by impurities that may detrimentally affect the composition of the pyrolytically precipitating substances during the manufacturing process. However, in cases where the above-mentioned temperature drop within the base plate, or between the top surface of the base plate and the location of the temperature sensor 27 is too great, it is sometimes preferable to provide another temperature sensor or gage on the top surface of the base 1. The second sensor can then cooperate with sensor 27 in controlling the flow of cooling liquid through the cooling channels 2 in order to prevent the surface at the top surface of base 1 from dropping below a given lower limit value.

As will be recognized from the drawing, the top surface of the base plate 1 is completely planar, completely disregarding the presence of the holder bodies 15 and 12. These two holders, however, are attached in their respective seats of base 1 and of conductor 5 respectively, only by a plug connection so that they can be readily removed if it is desired to clean the top surface of base 1.

The top surface of base 1 is ground or carefully lapped and its horizontal dimension is made sufficiently large to permit recipient bells 17 of varying diametrical sizes to be placed upon the top surface in accordance with the particular requirements to be met in the operation of the pyrolytic apparatus. When such a bell 17 is exchanged for another bell of different diameter, the insert plate 16, consisting of a material of the same type as used for the bell 17, is exchanged for another plate so dimensioned that again an only slight interspace remains between the peripheral surface of the insert plate and the inner periphery of the bell 17 to be employed. The bores in plate 16 are also so dimensioned that each time an only minute interspace can obtain between each of the holders 12, 15 and the inner periphery of the bores **16*a*, 16*b*. By observing these extremely slight gaps between holders 12, 15 and the bores in plate 16 as well as between the plate 16 and each bell 17 being used, only a very slight and negligible direct thermal influence can be exerted from the processing space 22 onto the top surface of the metal base 1**, so that the advantages desired by the invention remain secured.

To those skilled in the art, it will be obvious, upon a study of this disclosure, that with respect to various details of the choice of materials and apparatus according to our invention, a variety of modifications and hence embodiments other than particularly illustrated and described herein are possible, without departing from the essential features of our invention and within the scope of the claims annexed hereto.

We claim:

1. Apparatus for producing pure semiconductor material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient gas-tightly sealed on said top surface to provide an enclosed processing chamber, said base having duct means for supply and discharge of processing gas to and from said chamber, electrically conductive holder means mounted on said base in said chamber for holding and electrically energizing said precipitation carrier structure, said recipient consisting of material different from that of said base, and an insert plate removably seated on said top surface of said base in face-to-face contact therewith and extending over the entire inner cross section of said recipient adjacent to said top surface, said insert plate having substantially the same thermal properties as said recipient and containing openings through which said holder means protrude and openings for said duct means.

2. Apparatus for producing pure semiconductor material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient of vitreous material gas-tightly seated on said top surface to provide an enclosed processing chamber, said base having duct means for supply and discharge of processing gas to and from said chamber, electrically conductive removable holder means mounted on said base in said chamber for holding and electrically energizing said precipitation carrier structure, an insert plate of vitreous material disposed on said top surface in face-to-face relation thereto and extending over the entire inner cross section of said recipient adjacent to said top surface, and containing openings through which said holder means protrude and openings for said duct means, said insert plate and said recipient being exchangeable for a number of pairs of matching insert plates and recipients, said pairs having different respective diameters, and said top surface having a width sufficient for selectively accommodating any one of said pairs.

3. Apparatus for producing pure semiconductor material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient gas-tightly sealed on said top surface to provide an enclosed processing chamber, said base having duct means for supply and discharge of processing gas to and from said chamber, electrically conductive holder means mounted on said base in said chamber for holding and electrically energizing said precipitation carrier structure, said recipient consisting of material different from that of said base, an insert plate removably seated on said top surface of said base in face-to-face contact therewith and extending over the entire inner cross section of said recipient adjacent to said top surface, and containing openings through which said holder means protrude and openings for said duct means, said recipient and said insert plate consisting of vitreous material.

4. Apparatus for producing pure semiconductor material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient gas-tightly sealed on said top surface to provide an enclosed processing chamber, said base having duct means for supply and discharge of processing gas to and from said chamber, electrically conductive holder means mounted on said base in said chamber for holding and electrically energizing said precipitation carrier structure, said recipient consisting of material different from that of said base, and an insert plate removably seated on said top surface of said base in face-to-face contact therewith and extending over the entire inner cross section of said recipient adjacent to said top surface, and containing openings through which said holder means protrude and openings for said duct means, said recipient and said insert plate consisting of quartz.

5. Apparatus for producing pure semiconductor material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient gas-tightly sealed on said top surface to provide an enclosed processing chamber, said base having duct means for supply and discharge of processing gas to and from said chamber, electrically conductive holder means mounted on said base and in said chamber for holding and electrically energizing said precipitation carrier structure, said holder means being removably fastened to said base and protruding therefrom upwardly into said processing chamber when fastened, said recipient consisting of material different from that of said base, an insert plate seated on said top surface of said base in face-to-face contact therewith and extending over the entire inner cross section of said recipient adjacent to said top surface, and said insert plate being removable from said base and having respective holes traversed by said holder means when said plate is disposed on said top surface, said holes having a size substantially matching the cross section of said holder means.

6. Apparatus for producing pure semiconductor material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient gas-tightly sealed on said top surface to provide an enclosed processing chamber, said base having duct means for supply and discharge of processing gas to and from said chamber, electrically conductive holder means mounted on said base in said chamber for holding and electrically energizing said precipitation carrier structure, said recipient consisting of material different from that of said base, and an insert plate removably seated on said top surface of said base in face-to-face contact therewith and extending over the entire inner cross section of said recipient adjacent to said top surface, and containing openings through which said holder means protrude and openings for said duct means, said recipient and said insert plate consisting of vitreous material, electric insulating means in said base for insulating at least one of said holder means from said metal base, said insulating means consisting of synthetic plastic substantially inert chemically to the substances occurring in said processing chamber, said insulating means being separated from said chamber by said insert plate, and said synthetic plastic and said plate being adapted to each other so as to maintain said insulating means below its limit of temperature resistance by the heat shielding effect of said plate during operation of the apparatus.

7. Apparatus for producing pure semiconductor material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient gas-tightly sealed on said top surface to provide an enclosed processing chamber, said base having duct means for supply and discharge of processing gas to and from said chamber, electrically conductive holder means mounted on said base in said chamber for holding and electrically energizing said precipitation carrier structure, said holder means protruding upwardly from said top surface of said base into said processing chamber, a conical recess disposed in said base for each of said respective holder means, said conical recess facing said chamber and tapering outwardly thereof, and said holder means having respective conical junction ends mating said respective recesses and removably but firmly seated therein, said recipient consisting of material different from that of said base, an insert plate removably seated on said top surface of said base in face-to-face contact therewith and extending over the entire inner cross section of said recipient adjacent to said top surface, and forming openings through which said holder means protrude and openings for said duct means, said recipient and said insert plate consisting of vitreous material, said insert plate having openings through which said holder means extend into said processing chamber.

8. Apparatus for producing pure semiconductor material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient gas-tightly sealed on said top surface to provide an enclosed procesing chamber, said base having duct means for supply and discharge of processing gas to and from said chamber, electrically conductive holder means mounted on said base in said chamber for holding and electrically energizing said precipitation carrier structure, said recipient consisting of material different from that of said base, and an insert plate seated on said top surface of said base in face-to-face contact therewith and extending over the entire inner cross section of said recipient adjacent to said top surface, said recipient and said insert plate consisting of vitreous material, said insert plate having openings and said respective holder means protruding from said top surface of said base upwardly into said processing chamber, each of said holder means and the one of said precipitation carriers to be held thereby having mutually engageable portions frictionally seated one in the other, whereby said carriers can be attached and removed without using tools.

9. Apparatus for producing pure semiconductor material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient gas-tightly sealed on said top surface to provide an enclosed processing chamber, said base having duct means for supply and discharge of processing gas to and from said chamber, electrically conductive holder means mounted on said base in said chamber for holding and electrically energizing said precipitation carrier structure, said recipient consisting of material different from that of said base, an insert plate removably seated on said top surface of said base in face-to-face contact therewith and extending over the entire inner cross section of said recipient adjacent to said top surface, and forming openings through which said holder means protrude and openings for said duct means, said recipient and said insert plate consisting of vitreous material, electric insulating means in said base for insulating at least one of said holder means from said metal base, said insulating means consisting of synthetic plastic substantially inert chemically to the substances occurring in said processing chamber, said insulating means being separated from said chamber by said insert plate, and said synthetic plastic and said plate being adapted to each other so as to maintain said insulating means below its limit of temperature resistance by the heat shielding effect of said plate during operation of the apparatus, a conical recess disposed in said base for each of said holder means, each of said holder means comprising a carbon body seated in said conical recess and having another conical recess located in the top end of said carbon body in coaxial relation to said conical junction end of said same holder means, one of said respective precipitation carriers having a tapering end frictionally seated in said other recess so as to be rigidly secured to said carbon body but removable therefrom by pulling force.

10. Apparatus for producing pure semiconductor material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient gas-tightly sealed on said top surface to provide an enclosed processing chamber, said base having duct means for supply and discharge of processing gas to and from said chamber, electrically conductive holder means mounted on said base in said chamber for holding and electrically energizing said precipitation carrier structure, said recipient consisting of material different from that of said base, an insert plate removably seated on said top surface of said base in face-to-face contact therewith and extending over the entire inner cross section of said recipient adjacent to said top surface and containing openings through which said holder means protrude and openings for said duct means, said recipient and said insert plate consisting of vitreous material, said base having channels for passing a flow of coolant therethrough, and temperature sensor means mounted on said base for limiting the temperature of said base by controlling said coolant flow.

11. Apparatus for producing pure semiconductor silicon, material by thermal dissociation and precipitation of the material from a gaseous substance that contains the material as a component, onto precipitation carrier structure electrically heated by being traversed by electric current, comprising a processing vessel having a base of metal with a ground planar top surface and a bell-shaped recipient gas-tightly sealed on said top surface to provide an enclosed processing chamber, said base having duct means for supply and discharge of processing gas to and from said chamber, electrically conductive holder means mounted on said base in said chamber for holding and electrically energizing said precipitation carrier structure, said recipient consisting of material different from that of said base, an insert plate removably seated on said top surface of said base in face-to-face contact therewith and extending over the entire inner cross section of said recipient adjacent to said top surface, and containing openings through which said holder means protrude and openings for said duct means, said recipient and said insert plate consisting of vitreous material, said base having channels for passing a flow of coolant therethrough, and temperature sensor means mounted on said base for limiting the temperature of said base by controlling said coolant flow, said temperature sensor means being set for maintaining said temperature above a lower limit at which no appreciable formation of oily polysilanes is precipitated, and below an upper limit determined by the temperature resistance of the electrical components of said base.

References Cited by the Examiner

UNITED STATES PATENTS

| | | | |
|---|---|---|---|
| 2,967,115 | 1/1961 | Herrick | 23—223.5 X |
| 2,999,735 | 9/1961 | Reuschel | 23—223.5 |
| 3,021,198 | 2/1962 | Rummel | 23—223.5 |
| 3,053,638 | 9/1962 | Reiser | 23—223.5 |
| 3,134,695 | 5/1964 | Henker et al. | 118—49.5 |

FOREIGN PATENTS

| | | |
|---|---|---|
| 602,898 | 8/1960 | Canada. |

CHARLES A. WILLMUTH, *Primary Examiner.*

M. A. BRINDISI, *Examiner.*

E. STERN, P. FELDMAN, *Assistant Examiners.*